March 12, 1963 E. E. HANSON Re. 25,349

METHOD OF FORMING AN ENDLESS TIRE TREAD AND SIDEWALL PORTION ON A CARCASS BAND AND PRODUCT THEREOF

Original Filed May 16, 1956 4 Sheets-Sheet 1

INVENTOR.
ELMO E. HANSON

BY W. A. Fraser

ATTY.

March 12, 1963 E. E. HANSON Re. 25,349
METHOD OF FORMING AN ENDLESS TIRE TREAD AND SIDEWALL PORTION ON A CARCASS BAND AND PRODUCT THEREOF
Original Filed May 16, 1956 4 Sheets-Sheet 2
FIG-2
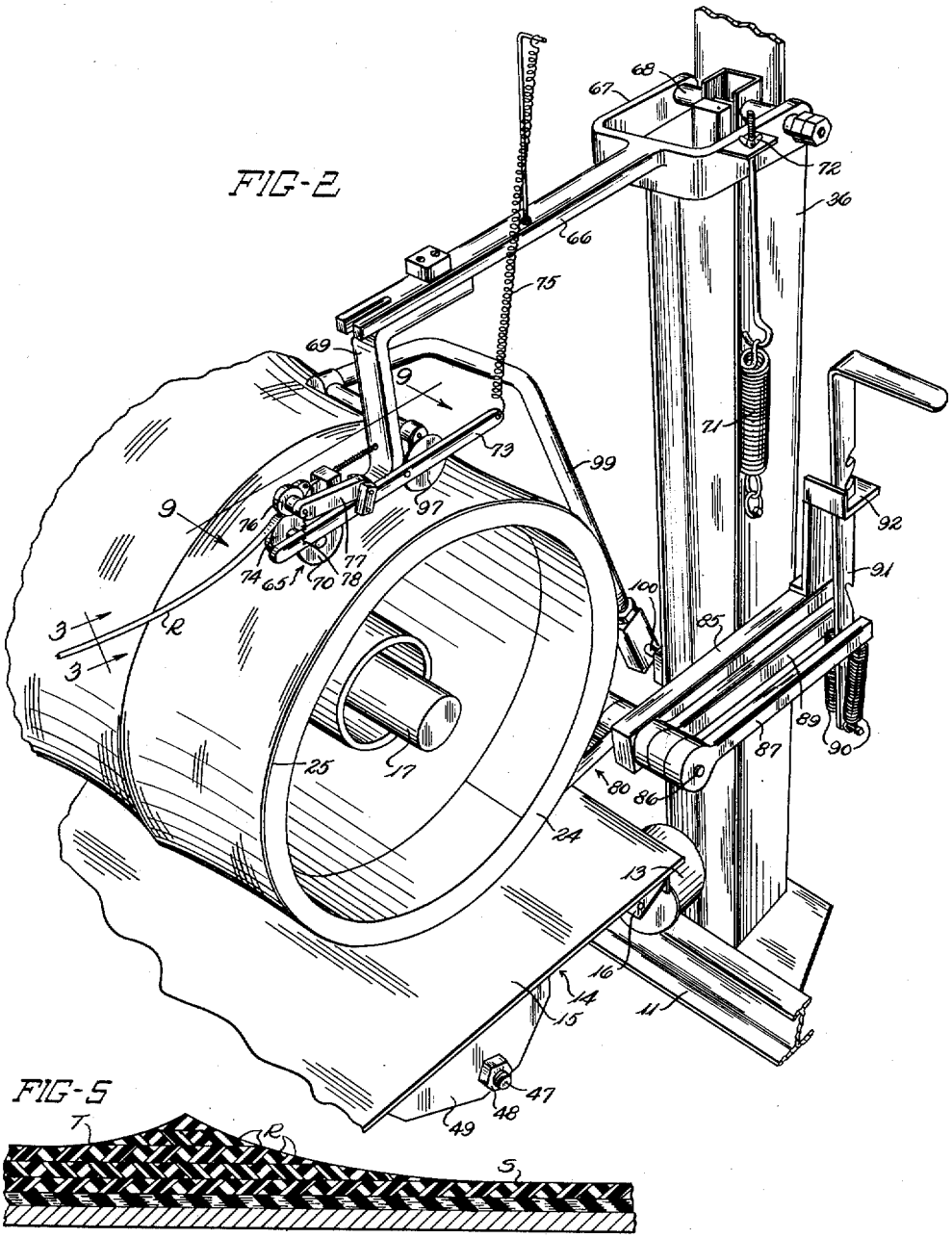
FIG-5
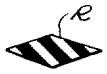
FIG-3
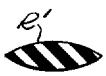
FIG-4
INVENTOR.
ELMO E. HANSON
BY W. A. Fraser
ATTY.

INVENTOR.
ELMO E. HANSON
BY W. A. Fraser
ATTY.

March 12, 1963 E. E. HANSON Re. 25,349
METHOD OF FORMING AN ENDLESS TIRE TREAD AND SIDEWALL PORTION ON A CARCASS BAND AND PRODUCT THEREOF
Original Filed May 16, 1956 4 Sheets-Sheet 4
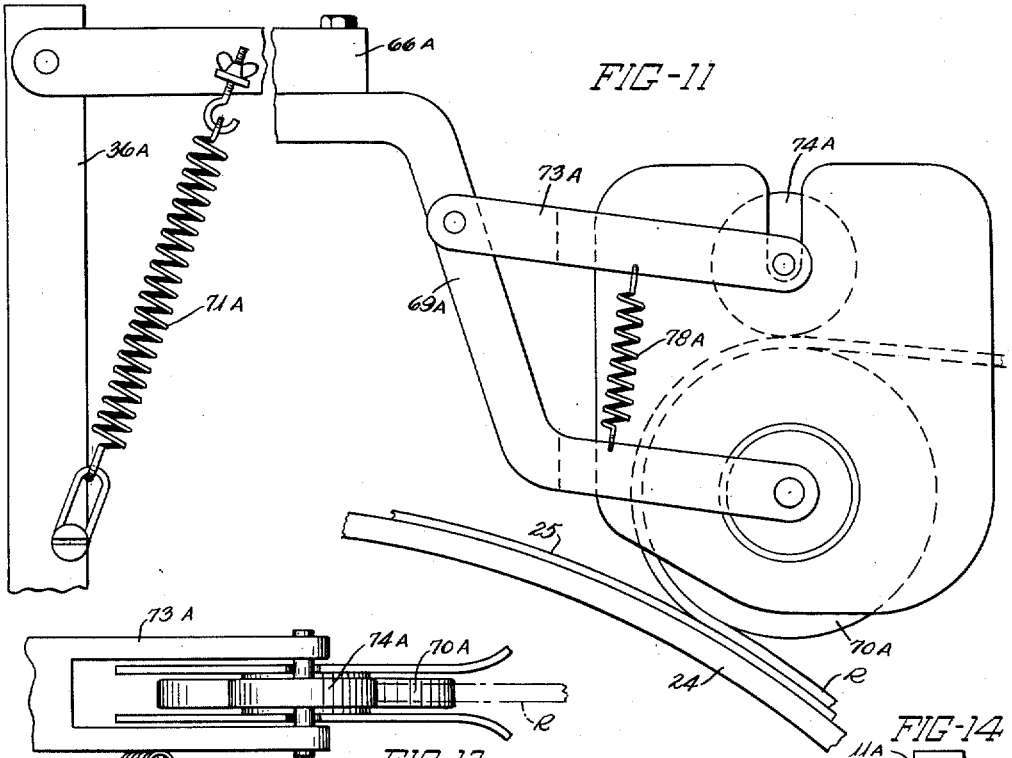
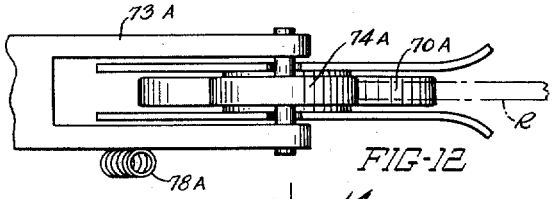
FIG-12
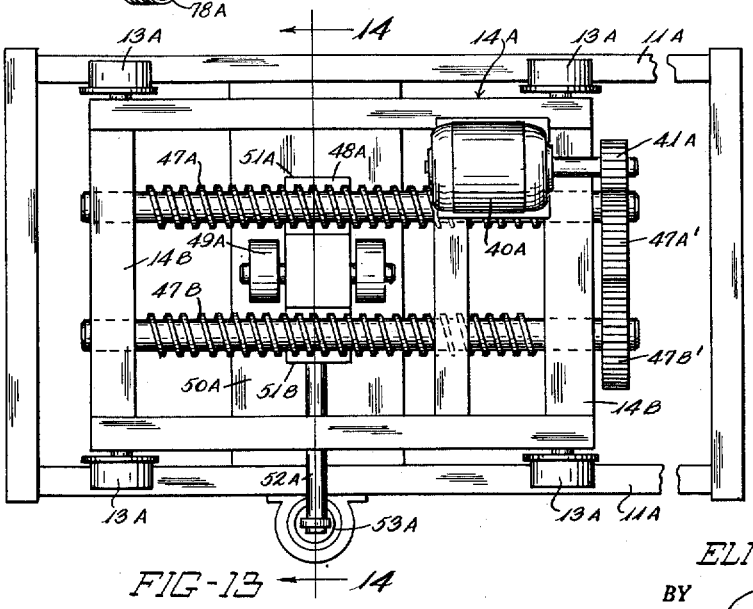
FIG-13
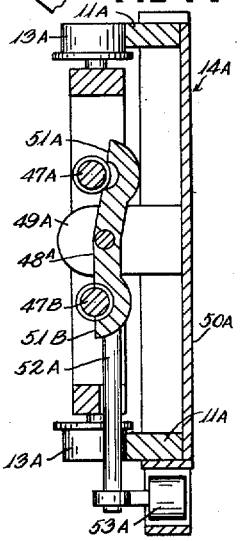
FIG-14
INVENTOR.
ELMO E. HANSON
BY W. A. Fraser
ATTY.

United States Patent Office

Re. 25,349
Reissued Mar. 12, 1963

25,349

METHOD OF FORMING AN ENDLESS TIRE TREAD AND SIDEWALL PORTION ON A CARCASS BAND AND PRODUCT THEREOF

Elmo E. Hanson, deceased, late of Akron, Ohio, by Lee C. Davies, administrator, Akron, Ohio, assignor to The Firestone Tire & Rubber Company, Akron, Ohio, a corporation of Ohio Original No. 2,849,049, dated Aug. 26, 1958, Ser. No. 585,357, May 16, 1956. Application for reissue Sept. 24, 1959, Ser. No. 836,046
11 Claims. (Cl. 156—130)

Matter enclosed in heavy brackets [ ] appears in the original patent but forms no part of this reissue specification; matter printed in italics indicates the additions made by reissue.

This invention relates generally to the manufacture of pneumatic vehicle tires, and more particularly to the building of a non-spliced tread and sidewall portion of uniform density on a carcass band preparatory to molding the tire into finished shape. The carcass is previously built up in a well-known manner, as for example on a drum, and comprises the usual plies of rubber and rubberized cord with bead portions at the edges of the band.

The conventional method of forming a tread-sidewall portion is first to extrude a solid strip of rubber having the full cross section of the tread with sidewall portions connected thereto, then cut the strip into proper lengths for wrapping around the carcass bands and butt splice the cut ends. This method presents many problems and difficulties.

In the first place extruding a full section of the tread-sidewall requires heavy, powerful and expensive extruding equipment and special skill in producing and maintaining the exact required cross-sectional contour. The consistency of the rubber stock varies and the degree of swelling after it passes through the extruding die varies accordingly so that it is almost impossible to maintain a uniform cross section in the extruded strip.

Second, the extruded strips are hot and must be properly cooled before being cut to length to minimize shrinkage at the cutting operation. This involves conveying the strips on long conveyors through cooling zones, requiring excessive time and extensive floor space. Even so, shrinkage at the cutting operation can not be completely eliminated, and as the shrinkage varies in different strips, uniformly accurate lengths are not produced.

Third, it is not practicable in production to apply the extruded strips to carcasses immediately upon cutting the strips to length, and storing the strips is not only an expensive operation requiring substantial equipment and floor space, but the stored strips tend to bloom and become contaminated, which detracts from the quality of the finished tires.

Fourth, the cooling and storing of the strips detracts from the inherent tackiness or adhesive property of the strip when it is applied to the carcass and the ends of the strip but spliced, and this disadvantage is even more pronounced with modern tread-sidewall materials having increasing amounts of synthetic rubbers. Accordingly, when the band-shaped carcass is expanded into an approximate tire shape before vulcanizing, the butt ends of the strip may partially separate and result in an imperfect tire, and if the separation occurs at the inner edge of the splice it may not be detected after molding and may ultimately cause tire failure. Heavy stitching devices, and the expedient of cementing the carcass and the splice ends of the tread-sidewall strips, have been resorted to, with only partial success in overcoming this difficulty.

Fifth, unavoidable variations in the length and cross-sectional contour of the extruded tread-sidewall strips makes the uniform distribution of the mass of tread material around the tire a very difficult problem requiring highly skilled and conscientious workmen, but even at best, a substantial proportion of tires in a production run are not statically balanced because of non-uniform density in the tread strip or at the splice, and a serious condition of tire thump results when the [the] tires are put into use.

I am aware that prior to the conventional practice of extruding full section tread-sidewall strips, it was common to build up tread strips from plies of calendered rubber in progressively narrower widths, evenly stepped at their edges, and then cut the built-up strips to proper length for application to carcass bands. However, this method had substantially all of the disadvantages of the present extruded tread method, plus the labor and expense of calendering and trimming. Moreover, the greater tendency of the tread to separate in service, and the greater difficulty of obtaining dynamic balance in the tread, led the tire industry to adopt the extruded tread method previously described.

I am also aware that solid tires have been made by running a strip of rubber directly from a calender onto a tire rim band having beads at its edges, and winding the strip on itself continuously until a thickness approximating that of the desired tire thickness was built up. The strip was substantially the full width of the rim band between beads and the edges of the overlapped turns of the strip required rough trimming to approximate the finished contour of the molded tire, but there was still an excess of rubber, resulting in a thick rind when molded, which was scrap or waste. Moreover, the density of the built-up calendered strip was not uniform and could not be accurately controlled.

According to the present invention, the tread portion and sidewall portions are built up on a carcass band in a novel manner which overcomes the problems and difficulties of prior methods. The extruding difficulties are substantially eliminated by extruding or otherwise forming a ribbon of very small cross section relative to the tire cross section; the ribbon is led directly onto the carcass band and the problems incident to cooling, shrinkage, accurate cutting to length, storage and poor adhesion to the carcass are obviated; and by winding the ribbon continuously on the carcass band and simultaneously controlling relative axial movement of the carcass band to partially overlap successive turns of the ribbon, tread and sidewall portions having exact cross sectional contour and uniform density are built up without requiring trimming or splicing.

The general object of the invention is to provide an improved method of building a tread and sidewall portion on a carcass band which will overcome the disadvantages of prior practices and economically produce a superior tire without a splice, having uniform density in the tread and sidewall portions so as substantially to avoid unbalance in said portions and eliminate tire thump normally resulting therefrom.

Specific objects include the accomplishment of a great reduction in the size, expense and space requirements of conventional extruding, handling, conveying, cooling and storage equipment; and virtual elimination of the present requirements of special skills in extruding full tread-sidewall sections and cutting them to exact lengths, in obtaining uniform cross section, adhesion and uniform distribution of the tread around the tire, and in splicing the ends of the tread. Another object is to produce an improved balanced tire having a tread and sidewall portion of uniform contour integrally united therewith.

These and other objects are accomplished by the improvements comprising the present invention, a preferred embodiment of which is disclosed herein by way of example, various modifications and changes in details thereof being comprehended within the scope of the appended claims. One form of apparatus for carrying out the invention is illustrated in the accompanying drawings, in which:

FIG. 2 is an enlarged fragmentary perspective view looking toward the near side of the drum.

FIG. 3 is an enlarged cross section of one form of the formed ribbon, as on line 3—3, FIG. 2.

FIG. 4 is an enlarged cross section of a modified form.

FIG. 5 is a fragmentary sectional view axially of the drum, showing how the desired tread contour is built up on the carcass.

FIG. 11 is a side view of a modified arrangement for applying the ribbon to the drum.

FIG. 12 is a plan view thereof.

FIG. 13 is a plan view of a modified arrangement for reciprocating the traveling carriage for the drum.

FIG. 14 is a sectional view on line 14—14 of FIG. 13.

Figure 1:
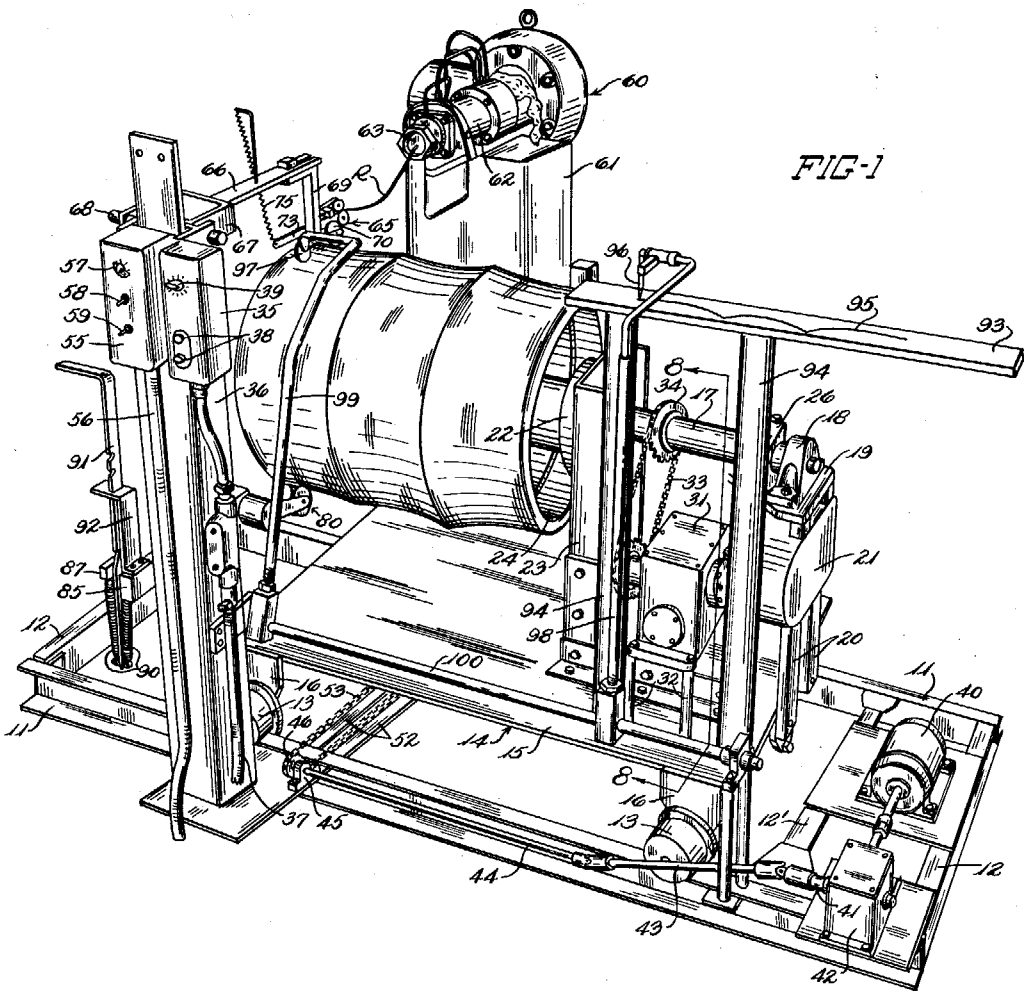
FIG. 1 is a perspective view looking toward an extruder for supplying ribbon, from the far side of a tire building drum on which the carcass band is mounted.
Figure 6:
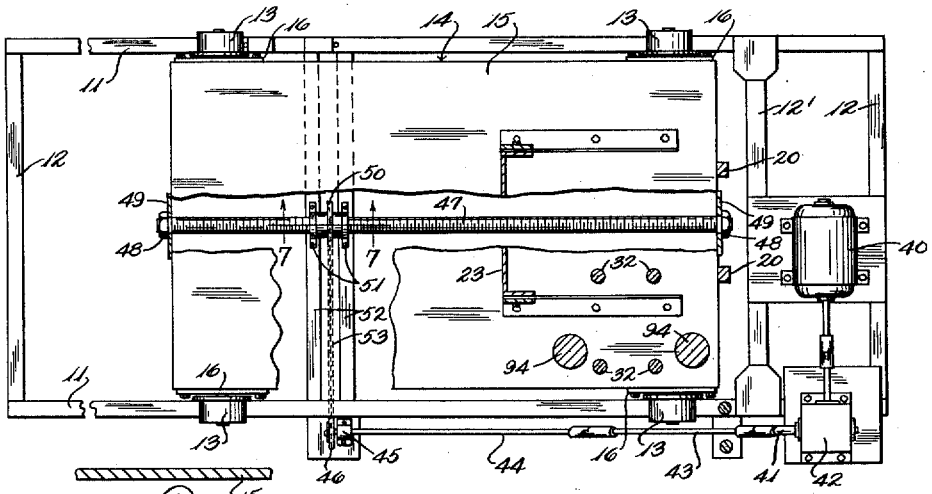
FIG. 6 is a plan view of the traveling carriage for the drum, taken below the drum.
Figure 7:
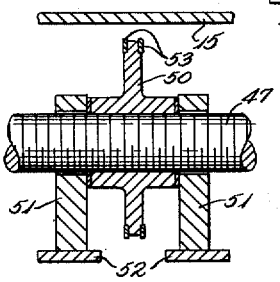
FIG. 7 is an enlarged fragmentary sectional view as on line 7—7, FIG. 6.

The apparatus shown in the drawings preferably includes two parallel rails 11 connected at their ends by lateral beams 12. The rails 11 form tracks for the flanged rollers 13 of the drum carriage indicated as a whole by 14. The carriage base comprises a rectangular plate or platform 15 with depending flanges 16 at the corners on which the flanged rollers 13 are journaled for rolling on the rails 11.

The drum shaft 17 is journaled at one end in a bearing 18 mounted on a bracket plate 19 supported on vertical bars 20 rising from one end of the platform 15 and extending through a housing portion 21. An intermediate portion of the shaft 17 is journaled in a bearing 22 mounted on the upper end of a channel post 23 supported on the platform. The other end of the shaft overhangs the platform and carries a conventional tire building drum 24 which may be made up of collapsible sections in a well-known manner for mounting or removing a carcass band 25 having built-up, rubberized fabric plies as best shown in FIG. 5. In FIGS. 1 and 2 the usual bead portions at the ends of the carcass band have been omitted for the sake of clarity. Means for holding the drum shaft 17 against rotation when the drum is collapsed may comprise a split clamp indicated at 26 in FIG. 1.

Figure 8:
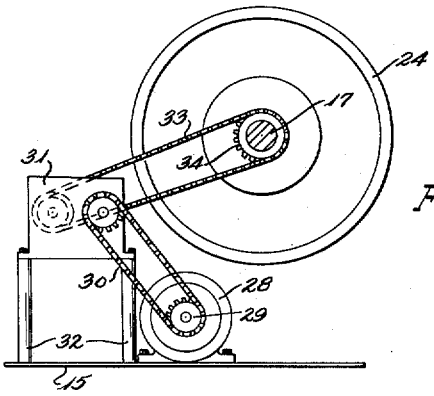
FIG. 8 is a fragmentary cross sectional view as on line 8—8, FIG. 1.

The means for rotating the drum may comprise a variable speed D.C. electric motor 28 (FIG. 8) mounted on the platform 15 and operatively connected by a sprocket 29 and drive chain 30 to the gear box 31 supported on posts 32. The gear box in turn drives the drum shaft 17 by means of a chain 33 and sprocket 34 on the shaft. The speed of motor 28 may be controlled by a thyratron-type controller (not shown) which gives a wide variation and an infinite number of speeds. However, other electronic controllers may be used.

The control box 35 for the motor 28 is preferably mounted on a stanchion 36 supported at the side of the rails 11, and is electrically connected to the motor through a flexible conduit 37, allowing relative movement of the motor on platform 15. The box 35 is provided with start and stop buttons 38 and a speed control knob 39.

CARRIAGE CROSS-FEED

The means for moving the drum carriage 14 back and forth on the rails 11 preferably includes a reversible, variable speed D.C. electric motor 40 supported on cross rails 12 and 12', and the motor has a suitable electronic controller (not shown) for giving a wide variation of speeds. A magnetic amplifier-type controller has been found satisfactory, although other well-known types could be used. The motor 40 drives a shaft 41 through a gear box 42, and a link 43 connects the shaft 41, by means of universal couplings, to an offset shaft 44 journaled in a bearing 45 supported on the rail 11 adjacent to stanchion 36. A sprocket 46 is mounted on the end of shaft 44.

Extending longitudinally of the under side of the carriage 14, parallel to the drum shaft 17, is a screw 47 which is secured at its ends by nuts 48 to flanges 49 depending from the platform 15. A sprocket 50 is threaded on screw 47 between bearings 51 supported on transverse bars 52 secured at their ends to the rails 11. Thus the sprocket 50 is rotatable on the shaft while prevented from movement axially thereof. A chain 53 operatively connects sprocket 46 to sprocket 50, so that as the motor 40 drives sprocket 50 it will move the carriage in one direction or the other, depending on the direction of rotation of the motor.

The control box 55 for the motor 40 is preferbaly mounted on stanchion 36 adjacent to control box 35, and is electrically connected to the motor through conduit 56. The box 55 is provided with a speed control knob 57, an on-off switch 58, and a reversing switch 59.

A conventional extruding machine, indicated as a whole at 60, is mounted on a suitable support 61 located laterally of the drum, preferably directly opposite the stanchion 36 and about midway of the longitudinal reciprocatory travel of the drum. The machine 60 shown in the drawings is a well-known Royle tuber and need not be described in detail, except to say that the housing 62 for the extruding screw is jacketed for heating or cooling the stock being extruded from the die 63. The tuber shown has a one-half inch diameter screw and a capacity of extruding about 25 pounds of rubber per hour, but the size and type of extruding machine may be varied as desired.

The cross-sectional size and shape of the ribbon R extruded is controlled by the size and shape of the opening in die 63 and the linear stretch to which it may be subjected, and the ribbon is guided and applied to the drum by a lay-down device indicated generally at 65 and mounted on the upper end of stanchion 36. A ribbon of the desired cross sectional size and shape may also be formed by other means such as a calender type mill having skiving knives to cut and shape the ribbon coming from heated calender rolls. As shown in FIG. 2, the lay-down device 65 is supported on the outer end of an arm 66 which extends over the drum and has a yoke 67 at its other end pivotally mounted at 68 on the stanchion 36.

RIBBON LAY-DOWN DEVICE

A Z-shaped bracket arm 69 is secured at its upper end to arm 66 and has a metal lay-down roller 70 journaled on its outer end. The arm 66 is urged downwardly to press the roller 70 against the drum with a desired amount of tension by means of a tension spring 71 attached at one end to stanchion 36, and adjustably connected to the yoke 67 by a bolt 72. A lever arm 73 (FIGS. 2 and 9) is pivoted intermediate its ends on the lower portion of arm 69.

A guide roller 74 is journaled on the outer end of lever arm 73, and roller 74 is yieldingly pressed against roller 70 by a spring 75 connecting the inner end of arm 73 with support arm 66. A pressure roller 76 is mounted on the outer end of an arm 77 pivoted at its inner end on lever arm 73, and a spring 78 connects the outer ends of arms 73 and 77 to urge the roller 76 against roller 74. The roller 74 is preferably flanged so that rollers 70 and 76 will nest between the flanges.

Figure 9:
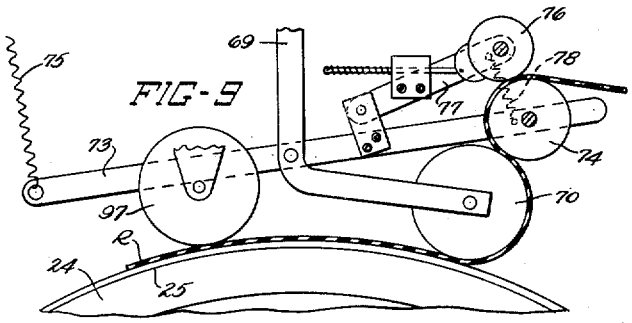
FIG. 9 is an enlarged fragmentary side elevation of the guide roller arrangement for applying the ribbon to the surface of the drum, as on line 9—9, FIG. 2.

As shown in FIG. 9, the ribbon is led between rollers 74 and 76, then between rollers 74 and 70, and around roller 70 onto the drum. The top wheel 76 is preferably made of a plastic known as Teflon because of its low adhesion to rubber, the middle wheel 74 is preferably of steel treated with a silicone to provide a partial adhesion to rubber, and the lower wheel is preferably of steel.

The path of the ribbon R between the rolls 74 and 76 and then between rolls 74 and 70 subjects the ribbon to a wringer action as it is applied to the drum, which acts to prevent entrapment of air between overlapping turns of the ribbon as it is laid down on the drum. As the ribbon is applied to the drum, the speed of rotation of the drum is controlled so that its peripheral speed is substantially equal to, and preferably slightly greater than, the linear extrusion or feeding speed of the ribbon, so that the ribbon is applied to the drum with a small amount of tension. At the same time the rate of axial movement of the drum relative to the ribbon and its lay-down device is controlled so that each turn of the ribbon partially overlaps the preceding turn in the manner shown in FIG. 5.

SHAPE AND SIZE OF RIBBON

The cross sectional shapes of the ribbon shown at R and R′ in FIGS. 3 and 4 have been found to provide a substantially uniform thickness of rubber when successive turns are partially overlapped. The shape in FIG. 3 may be described as a diamond shape and the shape in FIG. 4 as a rounded diamond. However, other modified shapes such as a half diamond, a truncated half or full diamond, and slightly rounded variations of such shapes, may also be used. An essential feature of all such shapes, in order to produce substantial uniformity of thickness when overlapped, is that the cross section of the ribbon shall have its greatest thickness at its central portion and taper laterally therefrom to its outer edges.

The cross sectional dimensions of the ribbon are governed by the tolerances required in the thickness of the sidewall portions to be formed, and the slope or inclination between the sidewall and tread portions. In other words, the greatest thickness of the ribbon may be substantially equal to but should not exceed the thickness of the sidewall at its thinnest section, so that when a single layer of overlapping turns of ribbon is laid down on the drum, the thickness of the layer will not exceed the desired thickness of the sidewall portion being formed. It is preferable to have the thickness of the ribbon substantially less than that of the sidewall portion so that two or more layers of overlapping turns are required.

The size of the extrusion die opening may be slightly larger than the cross sectional size of the ribbon as it is laid on the drum, to compensate for the stretch in the ribbon due to the tension therein resulting from the slight excess of peripheral speed of the carcass over the linear feed of the ribbon, as previously described. However, the fact that the ribbon swells somewhat upon emerging from the die must also be taken into account, the amount of swelling depending upon the stock characteristics and the extrusion temperature.

The cross sectional width of the ribbon is governed by the steepness of the slope in any portion of the tread T and sidewalls S to be formed. As is apparent from FIG. 5, when the tread portion is formed the direction of axial movement of the drum must be reversed at proper time intervals, becoming shorter and shorter as the overlapping turns approach the peaks or thickest tread sections. In order to obtain a substantially smooth slope or inclination between the tread and sidewall portions, the amount of overhang between adjoining turns must not be too great, and it is noted that the steeper the slope the narrower should be the ribbon to minimize the amount of overhang.

I have had excellent results in building passenger car tires of conventional sizes, using an extrusion die having a diamond-shaped orifice .05″ thick and .2″ wide, although these dimensions may vary considerably for reasons previously explained. Keeping in mind that the thinnest section of the sidewall portion in tires of conventional sizes is about .1″, the maximum thickness of the ribbon should not exceed about .1″. Based on the contours of conventional tread-sidewall portions, the maximum width of the ribbon should not exceed about .5″.

It should be noted that, since the ribbon coming from the extruder is heated it is very plastic and tacky, so that the overlapping turns as applied by the lay-down device are pressed and conformed together by the lay-down rollers, which smooths down overlapping edges and produces a smooth outer contour, as well as increasing the bond between the tacky abutting surfaces of the overlapping turns with each other and with the carcass.

STITCHING MECHANISM

Figure 10:
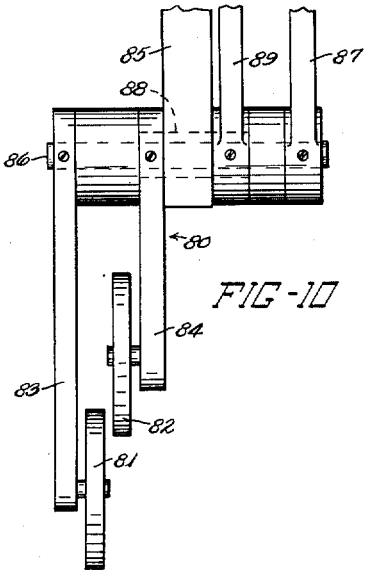
FIG. 10 is an enlarged fragmentary plan view of the stitching roller arrangement which bears against the under side of the drum.

Preferably, this smoothing and bonding is further improved by providing stitching rollers to iron and press the overlapping turns immediately after they are applied to the carcass and while they are still hot. As seen in FIGS. 1 and 2 the stitching device is indicated generally at 80, and is located behind the lay-down device substantially at the under side of the drum. It may be desirable to locate the device 80 closer to the lay-down device to press the turns of the ribbon while hot and immediately after they are applied to the drum. As seen in FIG. 10, the stitching device 80 may include two side-by-side rollers 81 and 82 so as to press against freshly-laid overlapping turns of the ribbon. The stitching device is located laterally opposite the lay-down device and the two side-by-side rollers insure that one roller or the other tracks directly over the freshly applied ribbon as the drum is moved axially in opposite directions.

The stitching rollers 81 and 82 are journaled at the outer ends of arms 83 and 84 respectively, and the inner ends of the arms are rotatably mounted on a bracket arm 85 secured to the side of the stanchion 36. The arm 83 is pinned on one end of a rocker shaft 86 rotatable in the bracket arm 85. A lever arm 87 is pinned at its outer end to the opposite end of the rocker shaft.

In order to permit independent rotation of the arm 84 it is pinned to a sleeve or bushing 88 rotatable on shaft 86 and also journaled in bracket arm 85. A lever arm 89 is also pinned at its outer end to sleeve 88. The inner ends of lever arms 87 and 89 are yieldingly connected through springs 90 to the bottom end of a handle bar 91 (FIG. 2), vertically adjustable in an angle bracket 92 on the stanchion for adjusting the tension applied to the lever arms 87 and 89, and accordingly adjusting the pressure of the stitching rollers 81 and 82 against the carcass band.

CONTOUR TEMPLATE

A template or profile of the cross sectional contour of the tread and sidewall portion to be formed on the carcass band is provided to guide the operator of the machine. The template may be an outline or profile of the desired contour which is placed on a platform or table 93 supported on one end of the drum carriage by posts 94 at a location easily watched by the operator standing at the controls 35 and 55. Preferably, the profile as indicated at 95 in FIG. 1, is the actual size of the tread and sidewall to be formed, although a magnified profile may be used with a correspondingly magnified motion of the pointer to reduce eyestrain and improve accuracy.

A stylus 96 is mounted over the template and is connected by a linkage to a follower roller 97 contacting the drum behind the lay-down device 65. The stylus 96 and roller 97 are connected by arms 98 and 99, respectively, to a rocker shaft 100 mounted on stationary brackets adjacent to the carriage, and the stylus and roller rotate about the rocker shaft as a center on equal radii. Thus, the stylus and roller move in a one-to-one relationship, and the position of the stylus on the template indicates to the operator the amount of rubber to be laid down at each point along the drum. The template table moves with the drum longitudinally back and forth under the stylus, and the stylus moves laterally of the template as the follower roller is raised or lowered by the contour of the tread and sidewall being formed on the drum.

OPERATION

In the operation of the apparatus shown in the drawings for carrying out the novel method of the invention, a green or unvulcanized carcass band previously built up according to conventional practice is mounted on the drum 24. The profile 95 for the specified tread sidewall contour is placed on the template table 93 in proper relation to a baseline corresponding to the center of the carcass between beads. Generally, the sidewall portions are built up first, and the sidewall stock fed to the tuber may be black or white as desired.

After the tuber is warmed up, a piece of freshly extruded ribbon is threaded through the lay-down mechanism 65, the tuber is stopped and the threaded ribbon is spliced to the ribbon from the tuber. The drum and tuber are then started and the speed of rotation of the drum adjusted at knob 39 so that a slight amount of tension is applied to the ribbon. The crossfeed for the carriage driven by motor 40 is also started by closing switch 58, the speed of the cross-feed having previously been adjusted at knob 57 to give the desired amount of ribbon overlap.

Depending upon the relative thickness of the ribbon and the sidewall portion, it may be necessary to reverse the direction of movement of the carriage cross-feed several times on reaching the edges of each sidewall portion, until the overlapped layers are built up to the desired sidewall thickness. This is done manually by the operator by means of switch 59. After both sidewall portions are built up to the desired contour, the tread stock is fed to the tuber, and if a change from white to black stocks is made, or if the tread stock is substantially different in composition and character, it may be necessary to stop the machine and clean out the tuber before feeding the tread stock thereto.

The same procedure is then followed in applying the ribbon of tread stock to the carcass between the already built-up sidewall portions, and the proper tread contour is obtained by reversing the cross-feed at the proper intervals to build up more overlapped layers in the heavier or thicker tread sections. It is preferable to operate the cross-feed to avoid interrupting the lay-down procedure, and to make a continuous pass of stock placement in the same direction across the entire tread at the very end.

While the method of the invention has been described as applied to building up tread and sidewall portions on a flat carcass band, the method can be performed on a carcass of tire shape built up on a torus-shaped core in accordance with known practice in building tires to special requirements.

It has been found that a wide range of conventional tread and sidewall stocks can be applied by the present method to carcass bands to produce green tires having excellent characteristics, especially in respect to balance, uniform contour and adhesion of the tread. Consequently, an intermediate product of improved characteristics is provided in the manufacture of vehicle tires, said product having a spliceless tread and sidewall integrally united with a carcass band before molding.

Moreover, in view of the elimination of a splice in the tread and sidewall portion, and the progressive building up and bonding of the overlapped turns of the ribbon, tread stocks having poor green stock adhesion and high abrasion resistance can be built by this method. One such stock, known as Butaprene T, a synthetic carboxyl-containing rubber which can not be formed into treads by conventional production methods, because of the scorchiness and lack of adhesion of the stock, has been successfully formed as a tire tread by the present method.

Tires of standard sizes molded from green tires having uniform tire bodies with tread-sidewall portions applied according to the present invention, when road-tested, showed no objectionable tire thump, had excellent riding and smoothness characteristics and low steering wheel vibration. The tires had excellent appearance, particularly white sidewall tires, which had sharply defined color lines, with none of the usual rib blisters in conventional white sidewall tires, indicating absence of air entrapment.

Tires molded from green tires made according to the present invention from standard tread and sidewall stocks were laboratory tested for balance, for thump caused by unbalance, for center gauge variation, tread flatness and radial run-out or out-of-roundness, and found to be materially improved in substantially all of these characteristics. These tires were also tested for tread separation occurring at high speeds as shown by tread cracking and so-called "tread chunk-out," which refers to pieces or chunks of the tread flying off the tire at high speeds. The results of these latter tests also showed marked improvement over the same tests on conventional tires.

The novel method is adapted to be performed by automatic mechanism, including a push button control for starting and stopping the feed of the ribbon to the lay-down device, and a coordinated drum rotating and cross-feed drive automatically controlled by a pattern or template for the desired cross section.

A modified form of lay-down device which is advantageous for automatic operation is shown in FIGS. 11 and 12, pivotally supported on a stanchion 36A by an arm 66A on the outer end of which is a Z-shaped bracket arm 69A. The arm 69A has a lay-down roller 70A journaled on its outer end, and the roller is yieldingly pressed against the drum by a spring 71A connected between stanchion 36A and arm 66A. An upper roller 74A is journaled on an arm 73A pivoted on an intermediate portion of bracket arm 69A and is urged against the roller 70A by a spring 78A.

A pair of guide plates are supported on bracket arm 69A on opposite sides of both rollers 70A and 74A to guide the ribbon between and around the rolls, and the entering edges of the guide plates are preferably flared outwardly, as shown in FIG. 12. The lower roller 70A may be flanged or grooved to insure maintaining the ribbon thereon. This roller 70A is preferably steel, not highly polished so that it would have slight adhesion to the rubber ribbon. The roller 74A is preferably of plastic material such as Teflon which has no adhesion to rubber, so that the ribbon feeding through the rolls will cling preferentially to the lower roll 70A.

The wringer action of rolls 70A and 74A on the ribbon will feed it through the lay-down device, thus enabling starting the lay-down operation merely by pushing the end of the ribbon into the bite of the rolls, and hence eliminating the necessity for manually threading the ribbon around the rolls of a lay-down mechanism such as shown in FIG. 9.

A modified form of drive mechanism for rotating the drum and driving the cross-feed from the same motor, and for reversing the direction of the cross feed during operation, is shown schematically in FIGS. 13 and 14. The drum carriage is indicated as a whole at 14A, rollably supported by flanged rollers 13A on rails 11A. A pair of laterally spaced screws 47A and 47B extend longitudinally of the base of the carriage and are journaled in carriage cross members 14B. The screws having meshing spur gears 47A' and 47B' on one end, and the single drive motor 40A drives a pinion 41A meshing with one of said gears. The pinion 41A also drives the drum shaft through suitable gearing (not shown).

A rocker arm 48A is pivotally mounted on a bracket 49A supported between the screws on a plate 50A spanning the undersides of rails 11A. Half nut portions 51A and 51B are provided at the ends of arm 48A for threadedly engaging the screws 47A and 47B one at a time. The rocker arm is connected by a bar 52A to a solenoid core 53A for raising and lowering the bar to engage one nut portion with its screw and disengage the other. Thus, in the position of FIG. 14, the nut portion 51B is engaged with screw 47B while nut portion 51A is disengaged from screw 47A. Energizing the solenoid to lower the bar will disengage nut portion 51B and engage nut portion 51A with screw 47A, consequently reversing the direction of the cross-feed of the carriage without interfering with the rotation of the drum driven by the single motor.

The novel method of the present invention greatly reduces the expense and space requirements, as well as the requirements of special skills, in forming, handling and applying tread and sidewall portions, as compared with prior practices. Furthermore, the present method produces a greatly improved intermediate product in tire manufacture, from which tires having superior characteristics can be produced.

What is claimed is:

1. The method of forming an endless tread-sidewall portion on the carcass band of a vehicle tire preparatory to molding the tire into finished shape, which comprises the steps of forming a heated continuous ribbon of elastomeric tire material, applying the ribbon progressively to the carcass band while rotating said carcass on its axis at a peripheral speed substantially equal to the linear speed of said ribbon to wrap the ribbon around the carcass band a plurality of times, moving the carcass and ribbon relative to each other axially of the carcass as the ribbon is wrapped around the carcass so as laterally to overlap adjacent turns of the ribbon, and reversing said relative movement at unequal intervals to build up a tread and sidewall portion of desired contour having uniform density and balance.

2. The method of forming an endless tread-sidewall portion on the carcass band of a vehicle tire preparatory to molding the tire into finished shape, which comprises the steps of forming a heated continuous ribbon of elastomeric tire material, the cross section of said ribbon having its greatest thickness at the central portion and tapering laterally therefrom to its outer edges, applying the ribbon progressively to the carcass band while rotating said carcass on its axis at a peripheral speed substantially equal to the linear speed of said ribbon to wrap the ribbon around the carcass band a plurality of times, moving the carcass and ribbon relative to each other axially of the carcass as the ribbon is wrapped around the carcass so as laterally to overlap adjacent turns of the ribbon, and reversing said relative movement at unequal intervals to build up a tread and sidewall portion of desired contour having uniform density and balance.

3. The method of forming an endless tread-sidewall portion on the carcass band of a vehicle tire preparatory to molding the tire into finished shape, which comprises the steps of forming a heated continuous ribbon of elastomeric tire material, said ribbon being substantially diamond-shaped in cross section and of the order of .2" wide and .05" thick, applying the ribbon progressively to the carcass band while rotating said carcass on its axis at a peripheral speed substantially equal to the linear speed of said ribbon to wrap the ribbon around the carcass band a plurality of times, moving the carcass and ribbon relative to each other axially of the carcass as the ribbon is wrapped around the carcass so as laterally to overlap adjacent turns of the ribbon, and reversing said relative movement at intervals to build up a tread and sidewall portion of desired contour having uniform density and balance.

4. The method of forming an endless tread-sidewall portion on the carcass band of a vehicle tire preparatory to molding the tire into finished shape, which comprises the steps of forming a heated continuous ribbon of elastomeric tire material, the cross section of said ribbon having its greatest thickness at the central portion and tapering laterally therefrom to its outer edges, the width of said ribbon being of the order of .2" and the thickness of the order of .05", applying the ribbon progressively to the carcass band while rotating said carcass on its axis at a peripheral speed substantially equal to the linear speed of said ribbon to wrap the ribbon around the carcass band a plurality of times, moving the carcass and ribbon relative to each other axially of the carcass as the ribbon is wrapped around the carcass so as laterally to overlap adjacent turns of the ribbon, and reversing said relative movement at intervals to build up a tread and sidewall portion of desired contour having uniform density and balance.

5. The method of forming an endless tread-sidewall portion on the carcass band of a vehicle tire preparatory to molding the tire into finished shape, which comprises the steps of forming a heated continuous ribbon of elastomeric tire material, applying the ribbon progressively to the carcass band while rotating said carcass on its axis at a peripheral speed substantially equal to the linear speed of said ribbon to wrap the ribbon around the carcass band a plurality of times, maintaining tension in the ribbon as it is applied to the band, moving the carcass and ribbon relative to each other axially of the carcass as the ribbon is wrapped around the carcass so as laterally to overlap adjacent turns of the ribbon, and reversing said relative movement at intervals to build up a tread and sidewall portion of desired contour having uniform density and balance.

6. The method of forming an endless tread-sidewall portion on the carcass band of a vehicle tire preparatory to molding the tire into finished shape, which comprises the steps of forming a heated continuous ribbon of elastomeric tire material, applying the ribbon progressively to the carcass band while rotating said carcass on its axis at a peripheral speed substantially equal to the linear speed of said ribbon to wrap the ribbon around the carcass band a plurality of times, the cross sectional thickness of said ribbon as it is applied to the band not exceeding the predetermined thickness of the thinnest section of the sidewall portion to be formed, moving the carcass and ribbon relative to each other axially of the carcass as the ribbon is wrapped around the carcass so as laterally to overlap adjacent turns of the ribbon, and reversing said relative movement at intervals to build up a tread and sidewall portion of desired contour having uniform density and balance.

7. The method of forming an endless tread-sidewall portion on the carcass band of a vehicle tire preparatory to molding the tire into finished shape, which comprises the steps of forming a heated continuous ribbon of elastomeric tire material, the cross section of said ribbon having its greatest thickness at the central portion and tapering laterally therefrom to its outer edges, applying the ribbon progressively to the carcass band while rotating said carcass on its axis at a peripheral speed substantially equal to the linear speed of said ribbon to wrap the ribbon around the carcass band a plurality of times, the cross sectional thickness of said ribbon as it is applied to the band not exceeding the predetermined thickness of the thinnest section of the side wall portion to be formed, moving the carcass and ribbon relative to each other axially of the carcass as the ribbon is wrapped around the carcass so as laterally to overlap adjacent turns of the ribbon, and reversing said relative movement at intervals to build up a tread and sidewall portion of desired contour having uniform density and balance.

8. The method of forming an endless tread-sidewall portion on the carcass band of a vehicle tire preparatory to molding the tire into finished shape, which comprises the steps of forming a heated continuous ribbon of elastomeric tire material, the cross section of said ribbon having its greatest thickness at the central portion and tapering laterally therefrom to its outer edges, applying the ribbon progressively to the carcass band while rotating said carcass on its axis at a peripheral speed substantially equal to the linear speed of said ribbon to wrap the ribbon around the carcass band a plurality of times, the cross sectional thickness of said ribbon as it is applied to the band not exceeding the predetermined thickness of the thinnest section of the side wall portion to be formed, and the cross sectional width of said ribbon not exceeding about .5", moving the carcass and ribbon relative to each other axially of the carcass as the ribbon is wrapped around the carcass so as laterally to overlap adjacent turns of the ribbon, and reversing said relative movement at intervals to build up a tread and sidewall portion of desired contour having uniform density and balance.

9. The method of forming an endless tread-sidewall portion on the carcass band of a vehicle tire preparatory to molding the tire into finished shape, which comprises the steps of mounting a flat band carcass on a rotatable tire building drum, extruding a heated continuous ribbon of elastomeric tread material adjacent to said drum, the cross section of said ribbon having its greatest thickness at the central portion and tapering laterally therefrom to its outer edges, rotating the drum at a peripheral speed substantially equal to the linear extrusion speed of said ribbon, applying said ribbon progressively to said carcass to wrap the ribbon around the carcass a plurality of times, the cross sectional thickness of said ribbon as it is applied to the band not exceeding the predetermined thickness of the thinnest section of the sidewall portion to be formed, and the cross sectional width of said ribbon not exceeding about .5", moving the drum axially as the ribbon is wrapped around the carcass so as laterally to overlap adjacent turns of the ribbon, and reversing said axial motion in such manner as to build up a central tread portion of desired contour.

*10. The method of forming the tread portion on the surface of a tire carcass comprising the steps of mechanically working an unvulcanized elastomeric material and*

*forming a heated unvulcanized continuous ribbon therefrom of predetermined thickness, immediately feeding said freshly formed heated ribbon directly onto the radially outer surface of a tire carcass before substantial cooling of the ribbon, wrapping said heated ribbon in successive convolutions around said surface in a series of continuous turns with said turns collectively extending across the entire width of the tread portion on said tire carcass to provide continuity of the tread between the lateral edges of said tread portion, progressively building up said tread portion by said convolutions to form said tread portion of a desired predetermined cross-sectional contour which is varied in thickness across the width of said tread portion, and overlapping convolutions of the turns of said ribbon across the width of said tread portion to form by the overlapped convolutions continuity of the tread between the lateral edges of said tread portion.*

*11. The method of claim 10 further comprising reversing the direction of wrapping of said ribbon at intervals to build up the sections of the cross-sectional contour of said tread portion having a thickness greater than the predetermined thickness of said ribbon.*

References Cited in the file of this patent or the original patent

UNITED STATES PATENTS

| | | |
|---|---|---|
| 709,993 | Moomy | Sept. 30, 1902 |
| 885,219 | Bayne et al. | Apr. 21, 1908 |
| 951,872 | Wirt | Mar. 15, 1910 |
| 1,335,879 | Darrow | Apr. 6, 1920 |
| 1,444,076 | Jury | Feb. 6, 1923 |
| 2,107,067 | Alderfer | Feb. 1, 1938 |
| 2,213,028 | Kraft | Aug. 27, 1940 |
| 2,352,055 | Witt | June 20, 1944 |
| 2,474,511 | Bacon | June 28, 1949 |
| 2,498,953 | Glynn | Feb. 28, 1950 |
| 2,556,264 | Flynn | June 12, 1951 |
| 2,609,320 | Modigliani | Sept. 2, 1952 |
| 2,614,058 | Francis | Oct. 14, 1952 |
| 2,672,914 | Weigold et al. | Mar. 23, 1954 |
| 2,676,637 | Frazier | Apr. 27, 1954 |
| 2,747,649 | Reed | May 29, 1956 |
| 2,767,741 | Knowland et al. | Oct. 23, 1956 |
| 2,906,314 | Trevaskis | Sept. 29, 1959 |